Sept. 1, 1953 J. F. ENGLISH, JR., ET AL 2,650,684
MAGNETIC FLUID CLUTCH
Filed May 20, 1949 3 Sheets-Sheet 1

INVENTORS
JAMES F. ENGLISH JR.
AND ANTHONY J. HORNFECK
BY
Raymond D. Junkins
ATTORNEY

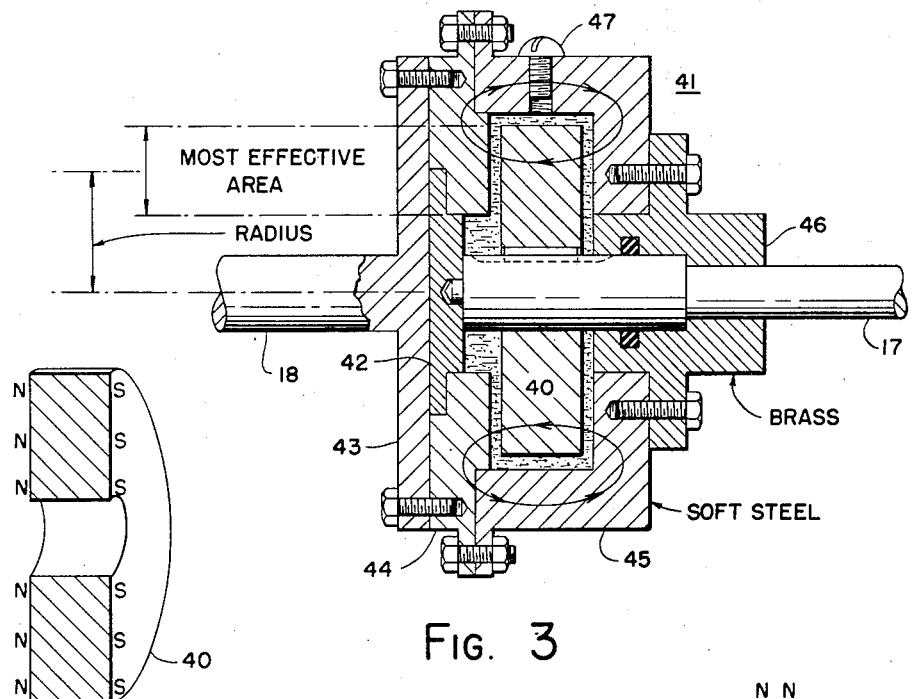
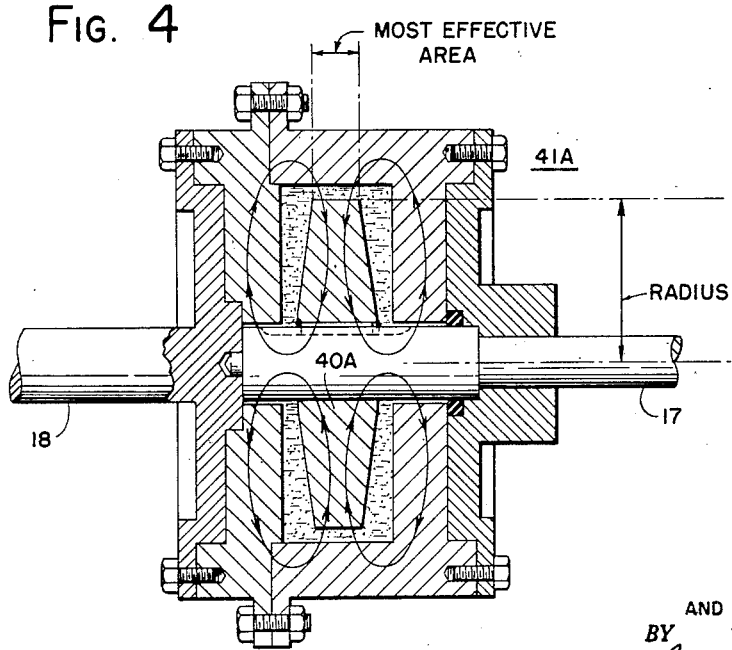
Fig. 3
Fig. 4
Fig. 5
Fig. 6

Sept. 1, 1953  J. F. ENGLISH, JR., ET AL  2,650,684
MAGNETIC FLUID CLUTCH
Filed May 20, 1949  3 Sheets-Sheet 3

INVENTORS
JAMES F. ENGLISH JR.
AND ANTHONY J. HORNFECK
BY
Raymond W. Junkins
ATTORNEY Patented Sept. 1, 1953

2,650,684

UNITED STATES PATENT OFFICE 2,650,684

MAGNETIC FLUID CLUTCH

James F. English, Jr., Lakewood, and Anthony J. Hornfeck, Lyndhurst, Ohio, assignors to Bailey Meter Company, a corporation of Delaware Application May 20, 1949, Serial No. 94,388

2 Claims. (Cl. 192—21.5)

The present invention relates to magnetic fluid clutches which operate on the following basic principle: When the space between two parallel magnetic surfaces is filled with finely-divided magnetic particles and a magnetic field is established between the two plates, the magnetic particles bind the plates together to resist movement parallel to their surfaces. The magnetic particles may be finely divided iron which, for most applications, is mixed with a liquid, such as oil, to prevent packing and to afford smoother operation. The fluid-particle (oil-iron) mixture will creep and tend to fill all parts of a cavity between magnetic surfaces and the stickiness or capillarity of the mixture will maintain an intimate contact with the surfaces with a tendency toward uniform dispersion of the particles between the surfaces. Dry particles would tend to settle and pack, frequently reducing the effective driving area of the parallel surfaces. Furthermore, the oil or other fluid carrier tends to lubricate the surfaces and particles and reduces wear.

When the mixture is acted upon by a magnetic field the fluid seemingly solidifies, freezes or congeals, as the iron particles become individual magnets and form chain ties inter-connecting the magnetic plates or surfaces.

As a clutch or driving connection between parallel surfaces the action is smooth because all contacting surfaces, both of the plates and of the iron powder particles, are coated by a lubricant.

Various means may be used to create a magnetic field between the surfaces. The present invention relates particularly to the use of a permanent magnet arrangement which will be illustrated and described.

In the drawings:

Fig. 3 is a longitudinal section of one form of our invention.

Fig. 4 is another view of a portion of Fig. 3.

Fig. 5 is a longitudinal section of another form of our invention.

Fig. 6 is another view of a portion of Fig. 4.

Figure 1:
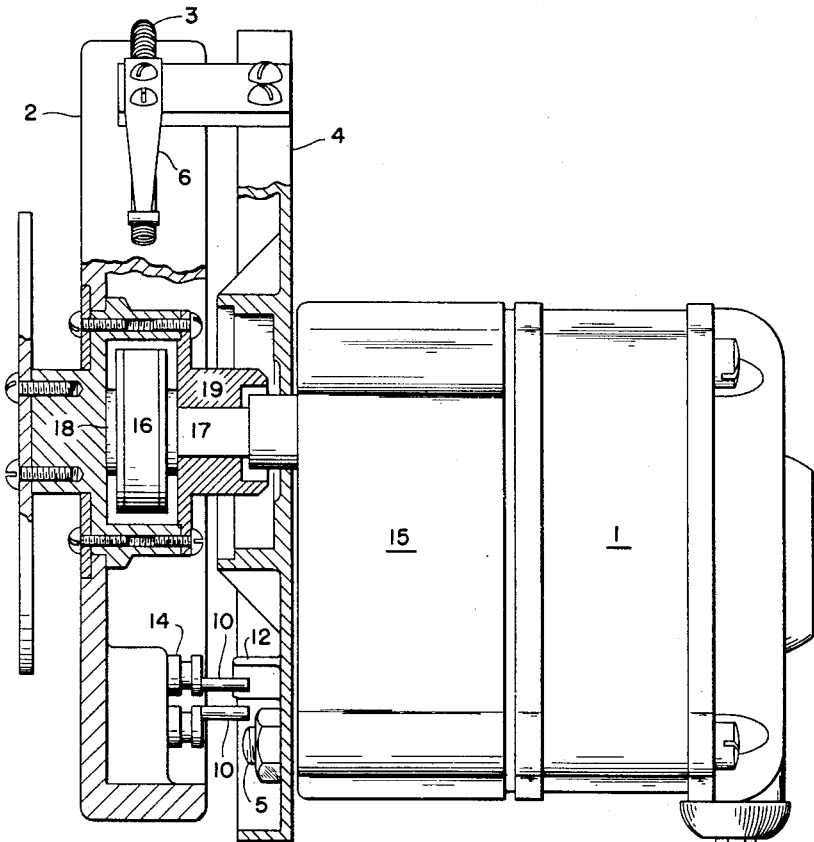
Fig. 1 is a partially sectioned side elevation of our invention embodied in a slidewire drive system.

Referring now in particular to Fig. 1, we show therein, in partial section, a motor drive assembly for a slidewire potentiometer. Instruments for measuring or controlling conditions which tend to vary from a desired value frequently include a balanceable bridge network responsive to the condition and a motor operating when the bridge is unbalanced to drive a mechanism or to control an agent in a manner tending to restore the condition to the desired value or to restore the bridge to balance condition. If a network bridge is employed in the control of the variable, the motor may operate upon unbalance to control the agent and at the same time to vary the relative positions of a potentiometer and its sliding contact in a direction to rebalance the bridge. Relative movements of the potentiometer slidewire and its contact must, of course, be limited so that the contact will not move out of engagement with the ends of the resistance. Usually the total relative travel of the slidewire and its contact is slightly under 360 degrees. To prevent any overtravel abutments may be provided for engagement when the limits of the adjustment range have been reached. If the abutments are engaged when the motor is operating at full speed, considerable load is placed on the driving connections. Where the condition is one having a tendency to fluctuate frequently in value an operation of the motor to its extreme limits may frequently be required. A repeated application of heavy loads on the driving connections by sudden stopping of the motor may soon result in a fracture of the connections. It is therefore desirable that the driving connections be designed so that they will stand up for long periods of time under intermittent applications of a heavy load.

It is a particular object of our invention to provide an improved driving connection between a motor and a slidewire potentiometer to the end that normally a substantially inflexible driving connection exists between the motor and slidewire but when a limit of travel is reached, there will be a yielding or slip to the end that the motor may continue to rotate without damage to itself or its reduction gearing. When the force causing the rotor to drive the driven mechanism against its limiting stop has been reversed so as to bring the mechanism back into its range of operation, the driving connection will assume its substantially inflexible characteristic under the influence of forces unimpaired in strength and direction despite their having been overcome to attain the desired slippage.

Referring now in particular to Fig. 1, it will be seen that the invention is incorporated in the drive connection between a motor 1 and a driven member 2 which carries a resistance or potentiometer wire 3. Attached to a frame member 4 which is fixed to the motor, as by bolts 5, is a contact member 6 slidably engaging the resistance wire. The contact member and resistance wire are adapted to be connected into a bridge circuit, not shown, which operates when unbalanced to effect an operation of the motor 1 to position the resistance wire relative to the contact member for rebalancing the bridge. In order that the member 2 may not be rotated in either direction so far that the resistance wire is moved out of engagement with the contact member, there are provided projecting members 10 which are adjustably fixed to the member 2 and are engageable with abutment portions 12, one of which is shown, on the frame member 4. Abutment portions 12 are spaced relative to each other and adapted to be engaged by the projecting members; and in order that the maximum angular movement of the member 2 may be varied, the projecting members are shown herein as being arranged eccentrically on elements 14 which are rotatably supported by the driven member. It will be seen that an engagement of one of the projecting members with an abutment portion, when the motor is operating at full speed, might result in a breaking of some part if a rigid drive connection is provided between the motor and the driven member.

In order to protect the motor and gear reduction system 15 against damage when a member 10 reaches a travel limit 12 we embody a driving and slip clutch 16 of the magnetic fluid type, which will be explained in greater detail relative to other figures of the drawing.

In the arrangement of Fig. 1, shaft extension 17 projects within the assembly 16 as the driving element of the magnetic fluid slip clutch, the driven end 18 of which is adapted to rotate the assembly 2 and hub 19, the latter of which forms a guiding outboard bearing sleeve around the shaft 17.

The motor 1 is arranged for reversible rotation and drives through the gear reduction 15 in selected direction to turn the shaft 17 and, through the agency of the driving slip clutch 16, to turn the assembly 2 and slidewire 3 in one direction or the other to rebalance the network. If the slidewire 3 is turned to a limit of travel in either direction, then one member 10 engages an abutment 12 which stops further travel of the slidewire 3 before the contact 6 passes off the end of the potentiometer wire. Continued energization of the motor 1 results in rotation of the shaft 17 and slippage of the magnetic fluid clutch 16, thus preventing any damage to the motor 1, reduction gearing 15, or other parts. Thus, under normal operation, a substantially rigid driving coupling is obtained between the shaft 17 and the housing 2, but if the housing assembly 2 is held against motion, then the magnetic fluid clutch slips as the forces of magnetism of the clutch are overcome. As will be explained more in detail hereinafter, the magnetic fluid clutch 16 includes a permanent magnet causing relative congealing of an oil-iron mixture through which the drive is accomplished, but also through which slippage will occur when the force of the magnet is overcome as the driven part is held from motion.

Figure 2:
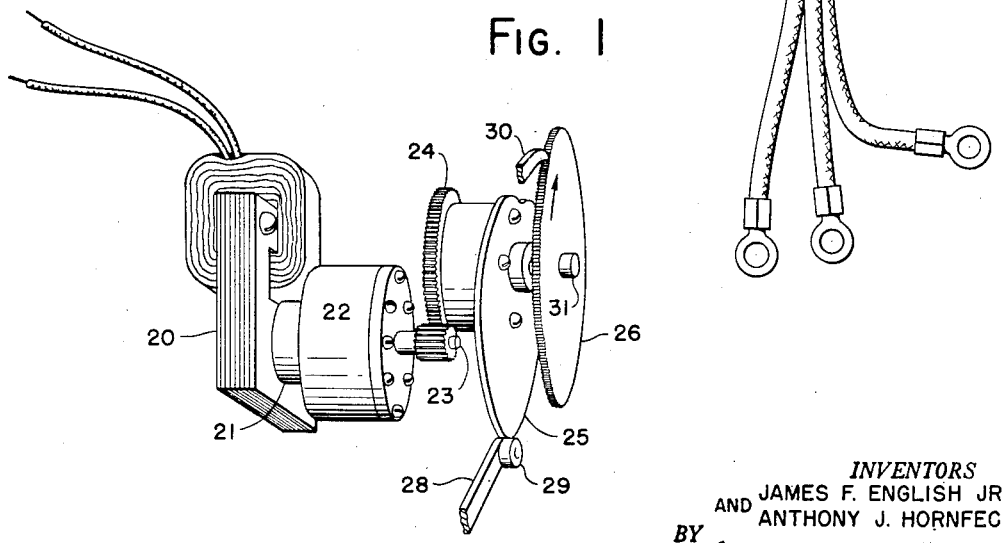
Fig. 2 is a perspective view of our invention in an integrator drive.

Referring now to Fig. 2, we show in prospective an escapement type integrator of the general type which is disclosed and claimed in the patent to Gorrie 1,892,183. A continuously rotating synchronous motor 20 drives through a gear reduction 21 to a magnetic fluid driving-slip clutch assembly 22 whose output shaft 23 is arranged to rotate the gear 24 at uniform speed in a single direction. Rotation of the gear 24 produces rotation of a cam 25 and a ratchet wheel 26. As pointed out in the referred-to patent a roller 29 continually rides the surface of the cam 25 to cause reciprocation of a beam, the other end of which is positioned in accordance with the value of the variable being integrated. The periodic reciprocation of said beam 28 affects the engagement of a pawl 30 (numbered 22 in the patent) with the ratchet wheel 26. If, for example, the cam 25 is operating on a 10 second cycle, then once in each cycle the pawl 30 may be released and re-engaged relative to the teeth of the ratchet wheel 26.

By way of illustration, the arrangement may be such that the shaft 31 of the ratchet wheel 26 drives a cyclometer counter to the end that when the wheel 26 is rotating then the counter is adding up and when the wheel 26 is non-rotating the counter is not adding up. Thus, during portions of the 10 second cycle, the counter may be adding up for increments (of the 10 second cycle) depending upon the value of the variable being integrated. By simplest explanation, if the rate of fluid flow being integrated is zero, then the pawl 30 is never released from the ratchet wheel 26 and the shaft 31 does not rotate and no integration is accomplished on the counter because there is no flow to be integrated. On the other hand, if the rate of flow is at 100% then the pawl 30 never engages the teeth of the wheel 26 and the shaft 31 continually drives the register. If the rate of flow is 50% of maximum, then for each 10 second cycle there are 5 seconds during which the pawl 30 is engaged and the shaft 31 does not drive and the remaining 5 seconds of the cycle the pawl 30 is released and the shaft 31 drives the counter; to the end that the counter is driven for 50% of the time thus integrating in accordance with 50% of maximum flow rate.

It will be seen that with this arrangement there is the possibility of an intermittent operation for varying lengths of time wherein a substantially rigid drive between the motor 20 and the output shaft 31 is desired and for alternate intervals of time there must be a slip of the magnetic fluid clutch 22 so that the motor 20 can continue to operate although the shaft 31 is held against rotation. The magnetic fluid clutch 22 will be described in detail in connection with the remaining figures of the drawing.

In Figs. 3 and 5 we show in longitudinal section two arrangements of magnetic fluid clutch, either of which may be useful at 16 of Fig. 1 or at 22 of Fig. 2.

Considering first the arrangement of Fig. 3 as it might be incorporated in the assembly of Fig. 1, the drive shaft 17 has keyed thereto an Alnico magnet 40 of disc shape adapted for rotation in a housing which we have generally indicated at 41. The housing comprises, in the present illustration, a number of parts which are fastened together but, of course, such a housing may be made in any convenient manufacturing form. It is only essential that certain portions be of magnetic, or non-magnetic, materials as will be pointed out.

The end of the driving shaft 17 is piloted in and bears against a brass disc 42, which is held against a disc 43 of soft steel formed as an extension of the driven shaft 18. A washer shaped piece 44 of soft steel is bolted to the disc 43 and serves to retain the bearing piece 42 as is clearly shown. The portion 45 of the housing 41 is held at the left-hand side in rigid assembly to the washer 44 while at its right-hand side is fastened thereto, a brass or other non-magnetic sleeve piece 46, which serves as a bearing for the driving shaft 17. O-rings may be used to seal the shaft 17, in the bearing member 46, so that the oil-iron mixture will not migrate along the shaft 17 to the exterior of the sleeve 46.

With the various parts assembled as shown in Figure 3, a cavity is formed within the housing 41 in which the magnet 40 is adapted to be rotated by the driving shaft 17. A filling plug 47 is provided so that the cavity (around the magnet 40 and shaft extension 17) may be substantially filled with an oil-iron mixture in fluid form comprising the driving means from the magnet 40 to the housing 41 and thereby to the output shaft 18.

Preferably the magnetic fluid mixture is a dispersion of fine iron particles in a carrier fluid which congeals, freezes, or tends to solidify in the cavity surrounding the magnet 40 to produce a drive connection between the magnet and the housing 41. Preferably a light oil is used as the carrier and the particles may be carbonyl E iron with an average particle size of about 8 microns. Carbonyl iron particles are spherical in form and are used in this art as a preferential type in shape, size and purity. The exact type of oil or carrier fluid, the percentage by weight or volume of the particles in the carrier fluid, and other specifications are a matter of choice or experimentation depending upon the size of the assembly, the amount of torque to be transmitted, etc. Inasmuch as the present invention is not restricted to such details of design, it is not felt necessary to stipulate them herewith.

As soon as the fluid mixture is introduced through the filling hole 47 it will be seen that, under the influence of the magnetic lines of force between the magnet 40 and the parts 43, 44 and 45, the fluid will tend to solidify and the question may be raised as to how the complete cavity can be filled past the initial congealed portion of the entering fluid. By slowly rotating the shaft 17 while holding the shaft 18 against rotation, the fluid may be introduced and readily worked to fill all portions of the cavity. Such filling is readily accomplished due to the nature of the mixture which comprises a lubricant with spherical particles suspended therein and thus with a minimum of internal friction. Once having filled the cavity the filling plug 47 is replaced.

It will be apparent that the magnetic lines of force between the magnet and the enclosing soft steel housing portions are toroidal in form around the complete periphery or outer surface of the magnet 40. We have diagrammatically indicated this in Fig. 3. Preferably the magnet 40 has previously been made a permanent magnet as shown in half section in Fig. 4 with the N pole on one flat face and the S pole on the other flat face.

In Fig. 5 we show a preferred construction wherein the magnet 40A (shown in half section in Fig. 6) is tapered from the hub end towards the outer periphery and magnetized with one pole on the peripheral surface and with the other pole around the interior of the hub portion. Such shape provides an S pole area substantially the same as the N pole area, considering not only the thickness of the magnet disc but the different circumferences involved.

By magnetizing the magnet 40A radially (as shown in Fig. 6) the lines of force appear as diagrammatically shown in Fig. 5 as a pair of generally toroidal envelopes resulting in a far greater effective torque between the magnet 40A and the housing 41A than in the design of Fig. 3 between the magnet 40 and the housing 41. We have indicated on Figs. 3 and 5 the relative effective torque and the radius at which it is effective. Either of the arrangements of Fig. 3 or 5 may be used in the assemblies of Figs. 1 and 2.

The outline of an auxiliary problem of design is recognized by indicating some of the dimensions covering torque produced by the magnets in Figs. 3 and 5. The area of the greatest concentration of flux around the magnet in Fig. 3 is indicated, with a notation of the relative position of the radius thru which the force produced by said flux acts in relation to the driving and driven shaft diameters. The area of the pole face of the magnet opposite the parallel surface of the soft steel housing 43 constitutes a dimensional basis for calculation of torque required for a particular application.

In Fig. 5 the inner and peripheral location of magnet poles result in a peripherical area whose flux produces a force in accordance with the size of said area and its relation with the pole face of the inner, axial area. Such force will act thru a moment arm as indicated in Fig. 5 to produce the desired value of torque.

Figure 7:
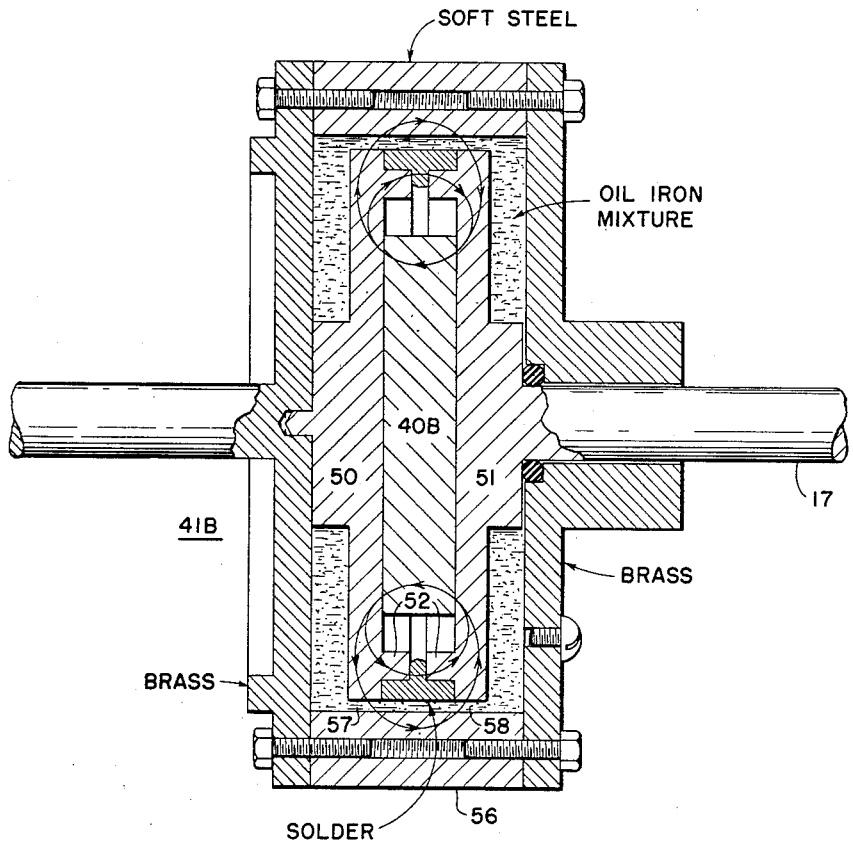
Fig. 7 is a longitudinal section of a driving clutch assembly.
Figure 8:
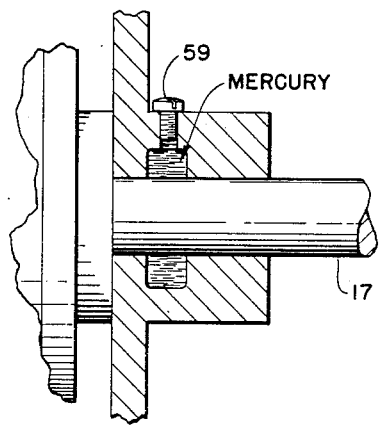
Fig. 8 is a detail of a bearing seal.

In describing the arrangements of Figs. 7 and 8, it will be understood that either arrangement may be used with Figs. 1, 2, 3 or 5.

Referring now in particular to Fig. 7, it will be noted that the Alnico metal magnet 40B is clamped between two soft steel plates 50 and 51 in such manner that a considerable groove or cavity surrounds the periphery of the magnet 40B. The plates 50 and 51 are formed with inwardly extending lips 52 not quite meeting across the peripheral face of the magnet 40B. The lips are joined by lead or solder (Fig. 7) to make an assembly of parts 50, 40B, 51 and keep the oil-iron mixture from entering the cavity. The arrangement is such that the assembly may be magnetized and placed in the housing 41B without losing a substantial amount of its permanent magnetism. It is well known that when a permanent magnet is magnetized by an electromagnet and then removed from the influence of the electro-magnet, it immediately loses a considerable portion of its magnetism which is never regained. By the construction illustrated the inner flux path as shown in Fig. 7 exists after the magnet has been removed from the influence of the electro-magnet and the decrease or permanent loss of magnetism is very small.

When the assembly is inserted in the housing 41B (as shown in Figure 7) the lines of force include a path through the fluid-iron mixture forming a toroidal envelope around the periphery of the assembly 40B, 50, 51, and into the surrounding soft steel member 56. This is because the lines of force find less resistance in crossing the path of the congealed fluid-particle mixture as at 57, 58, than through the path of the solder filler ring. In order to insure this path at 57, 58 the gap between the perimeters of plates 50 and 51 is never less in dimension than the magnetic flux path at 57, 58.

Thus we have made provisions for making a permanent magnet such as 40, 40A, or 40B, which retains a majority of its magnetism upon removal from the influencing electro-magnet and thus is a decidedly stronger magnet for its size when installed in the general assembly being described.

In Fig. 8 we show a detail of a seal around the shaft 17 to prevent migration of the oil-iron mixture along the shaft from the inner cavity to the exterior. Mercury is placed in an annular cavity surrounding the shaft 17, through a filling plug 59, and its peculiar surface tension properties prevent it from itself being lost out along the shaft as there is no appreciable pressure difference across the plane of contact of the mercury with the shaft outer surface. It does, however, prevent migration of the oil-iron fluid from the inner cavity to waste along the rotating shaft 17.

While we have chosen to illustrate and describe certain preferred embodiments of our invention, it will be understood that this is not to be considered as limiting and is by way of example only.

What we claim as new and desire to secure by Letters Patent of the United States is:

1. A magnetic fluid drive-slip clutch including in combination; a first shaft; a second shaft; a cylindrical fluid tight housing, secured by an end wall of non-magnetic material to only one of the shafts for rotation therewith, receiving the other of the shafts through the opposite end wall of non-magnetic material formed to act as a bearing, and having its annular wall of soft steel; a permanent magnet structure fixed to the shaft end received through the housing wall with its flux having a path through the annular housing wall and comprising, two soft steel plates with aligned cavities, a disc of magnetized hard steel symmetrically deposed within the cavities preventing the perimeters of the cavities from meeting, and a body of solder-lead joining the peripheral edges of the two soft steel plates; and a fluid capable of increase in viscosity under magnetic influence filling the housing around the magnet structure.

2. The combination of claim 1 wherein the gap between the perimeters of the soft steel plates is not less in dimension than the magnetic flux path through the fluid-particle mixture to the housing.

JAMES F. ENGLISH, Jr.
ANTHONY J. HORNFECK.

References Cited in the file of this patent

UNITED STATES PATENTS

| Number | Name | Date |
|---|---|---|
| 1,416,047 | Meyer | May 16, 1922 |
| 1,641,377 | Eisenhauer | Sept. 6, 1927 |
| 1,991,229 | Riley | Feb. 12, 1935 |
| 2,121,082 | Harrison | June 21, 1938 |
| 2,153,195 | Lilja | Apr. 4, 1939 |
| 2,214,901 | Griffin | Sept. 17, 1940 |
| 2,444,329 | Booth | June 29, 1948 |
| 2,546,344 | Levy | Mar. 27, 1951 |
| 2,557,140 | Razdowitz | June 19, 1951 |
| 2,575,360 | Rabinow | Nov. 20, 1951 |

FOREIGN PATENTS

| Number | Country | Date |
|---|---|---|
| 485,591 | Belgium | Nov. 13, 1948 |